(12) United States Patent
Kampmeier et al.

(10) Patent No.: US 6,754,311 B1
(45) Date of Patent: Jun. 22, 2004

(54) ENHANCED SUBSCRIBER LINE CALL MONITORING

(75) Inventors: Eric Edward Kampmeier, Sycamore, IL (US); David B. Smith, Hinsdale, IL (US); Matthew Richard Smith, Hinsdale, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/569,926

(22) Filed: May 11, 2000

(51) Int. Cl.[7] .................................................. H04M 1/24
(52) U.S. Cl. ............................... 379/32.01; 379/32.04; 379/24
(58) Field of Search ........................... 379/32.01, 32.04, 379/35, 41, 51, 67.1, 85, 88.19, 88.2, 88.21, 88.22, 88.23, 88.25, 88.26, 88.27, 127.01, 127.06, 265.13, 266.1, 221.11, 34, 111, 112.01, 112.06, 112.07, 112.08; 380/247, 255, FOR 109

(56) References Cited

U.S. PATENT DOCUMENTS

| | | | | |
|---|---|---|---|---|
| 5,590,171 A | * | 12/1996 | Howe et al. ................... 379/33 |
| 5,802,502 A | * | 9/1998 | Gell et al. ................... 379/114 |
| 5,857,009 A | * | 1/1999 | Handig ........................ 379/34 |
| 5,943,393 A | * | 8/1999 | Howell ........................ 379/35 |
| 5,974,142 A | * | 10/1999 | Heer et al. ..................... 380/9 |
| 6,052,438 A | * | 4/2000 | Wu et al. .................. 379/67.1 |
| 6,072,860 A | * | 6/2000 | Kek et al. ................ 379/88.25 |

* cited by examiner

Primary Examiner—Stella Woo
Assistant Examiner—Rexford Barnie
(74) Attorney, Agent, or Firm—Reginald J. Hill

(57) ABSTRACT

Enhanced subscriber line monitoring is provided for telephone calls in a telecommunications network. A telecommunications switch (102) is coupled to adjunct processor (104). Subscriber lines (110) terminated by the telecommunications switch are selectively monitored. Call identifying information and call content received by the telecommunications switch is forwarded to the adjunct processor for storage and analysis. The analysis includes determining the class of call content, e.g., voice or data. Call content is used to determine quality associated with a call. The call analysis is used for network management, new service development, long term usage forecasting, service differentiation for billing and targeted marketing opportunities.

16 Claims, 2 Drawing Sheets

ENHANCED SUBSCRIBER LINE CALL MONITORING

FIELD OF THE INVENTION

The present invention relates generally to telecommunications, and in particular, to a method and apparatus for monitoring telephone lines in real time for connection and content details to enhance service to subscribers.

BACKGROUND OF THE INVENTION

Telecommunications service providers are continually striving to improve their networks and the services provided by their networks. This requires some degree of network management, long term usage forecasting, service differentiation for billing and targeted sales opportunities. A telecommunications service provider is presented with a number of challenges in trying to improve its network and network services. Recently, the increase in data traffic due to the Internet and other data communications has presented additional challenges to the telecommunications service provider to manage its network and determine usage forecasting. In particular, the diversity of call types, including voice calls, data calls, and video traffic, provides a great deal of variance in the needs and usage of a telecommunications network.

Presently, summary information relating to calls placed over a telecommunications network is collected for analyzing network usage and long term forecasting. This summary information typically includes billing type information, such as the called number, calling number, time of the call and duration of the call. While this information is important, it is not adequate for monitoring diverse network usage, including a mixture of voice and data calls. Also, this summary information is not typically analyzed during a period in which the call is made. In other words, this summary data is not analyzed in real time for determining network services and management. Also, the summary information fails to adequately indicate the quality of service provided by the network over the call.

In light of the shortcomings of only having summary information related to calls for network management and forecasting, a need exists for enhanced subscriber line call monitoring that provides real-time data relating to calls, including data for analyzing the quality of service.

SUMMARY OF THE INVENTION

In accordance with the present invention, a method and apparatus are provided for enhanced subscriber line call monitoring. The method and apparatus include a telecommunications switch in conjunction with an adjunct processor that is coupled to the telecommunications switch. The telecommunications switch terminates a plurality of communication lines to subscriber equipment. Preferably the switch, in conjunction with the adjunct processor, monitors calls associated with subscriber equipment terminated on the telecommunications switch. First, a telephone call is established with a subscriber line via the telecommunications switch. If the call is to be monitored, as determined by alternative selection criteria, then a connection is established between the telecommunications switch and the adjunct processor. Call identifying information associated with the telephone call is sent to the adjunct processor along with all call content generated and received by the subscriber line during the call. Optionally, call content is altered, scrambled, or encrypted to protect the subscriber's privacy, without changing the transmission quality. The adjunct processor stores the call content and call identifying information for analysis, including real-time analysis of the type of call, quality of the call, and duration of the call. The adjunct processor provides real-time feedback to the telecommunications switch so that the telecommunications switch may modify service, for example, to adjust a per-line impedance matching network to improve transmission quality.

The enhanced call monitoring is used for network forecasting, network rearrangement, routing changes, quality studies, new service selection, selective marketing, and alarms on certain events or thresholds.

DETAILED DESCRIPTION OF THE PREFERRED EMBODIMENTS

Figure 1:
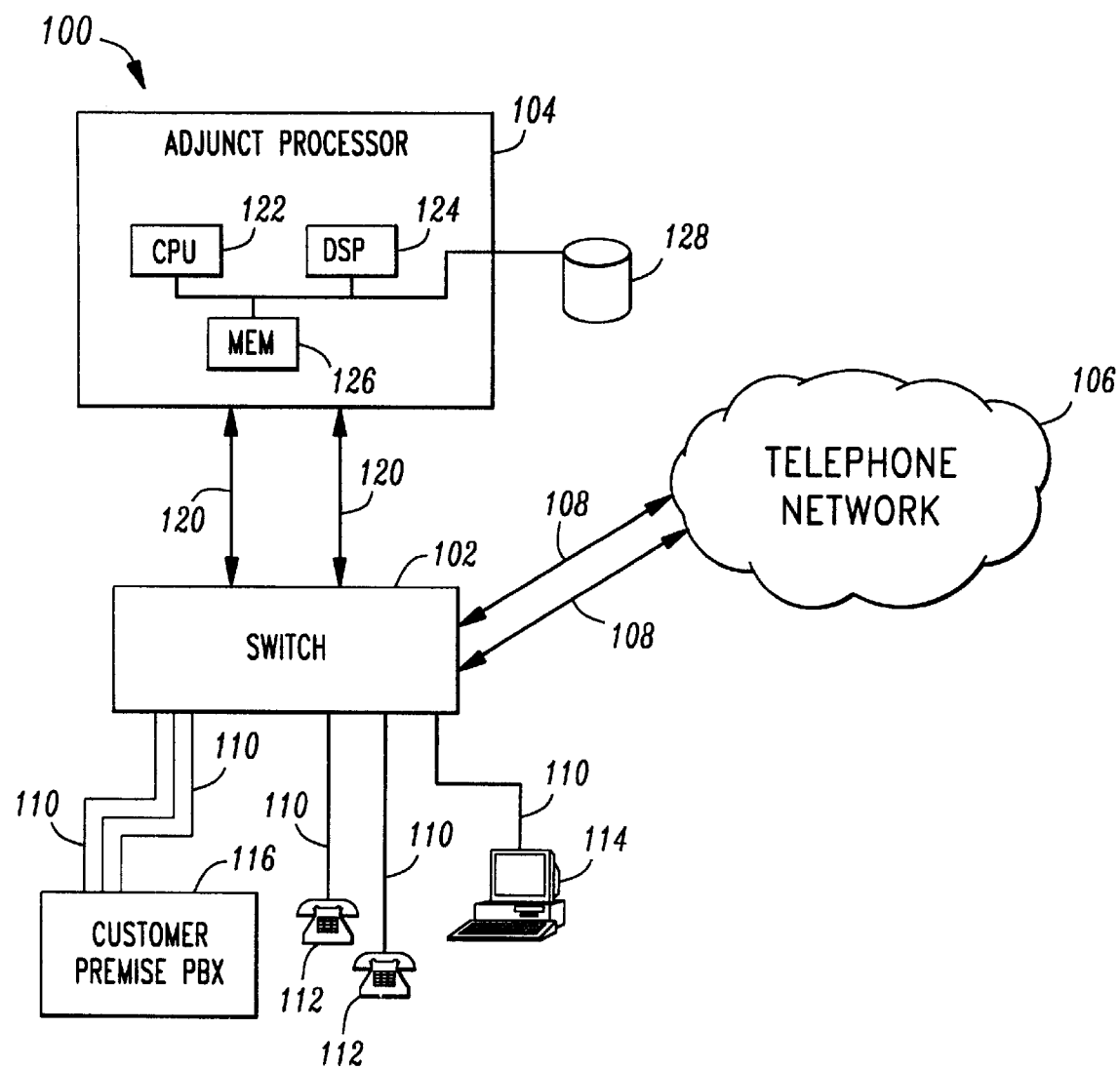
FIG. 1 is a block diagram of a telecommunications system for implementing enhanced subscriber line call monitoring in accordance with the present invention.

FIG. 1 is a block diagram of a telecommunications system 100 for implementing enhanced subscriber line call monitoring in accordance with the present invention. Telecommunications system 100 includes a telecommunications switch 102 coupled to an adjunct processor 104. Telecommunications switch 102 is coupled to a telephone network 106 via communication links 108 in a manner well known to those of skill in the art. Telecommunications switch 102 terminates a plurality of subscriber lines 110. Subscriber lines 110 couple an assortment of customer premise equipment to switch 102. For example, subscriber lines 110 are shown coupled to telephones 112, computer 114 or a customer premise PBX 116. Subscriber lines 110 are lines, trunks, or any other communication links for interconnecting communication devices to a telecommunications switch 102.

Adjunct processor 104 is coupled to switch 102 via communication links 120. Communication links 120 preferably include data interfaces and trunk interfaces for receiving and transmitting data and audio information associated with telephone calls. Communication links 120 adhere to an industry standard protocol, for example J-standard 025, or preferably, adhere to a proprietary protocol.

Adjunct processor 104 is any processor-based apparatus for receiving, storing and analyzing call identification and call content. Also, adjunct processor 104 provides real-time feedback to switch 102 in response to the call identification and call content. Adjunct processor 104 preferably includes central processing unit (CPU) 122, digital signal processor (DSP) 124, memory 126 and disk 128. CPU 122, memory 126 and DSP 124 establish communications with switch 102 and analyze call content in accordance with stored programs. In particular, digital signal processor 124 performs digital signal analysis on call content received from switch 102. Disk 128 stores call identification and call content information.

Telecommunications switch 102 is preferably a 5ESS® or 7R/E telecommunications switch available from Lucent Technologies, Murray Hill, N.J. Telecommunications switch 102 establishes and routes calls for subscriber lines 110. Telecommunications switch 102 sends call identifying information and call content to adjunct processor 104. Optionally, switch 102 scrambles or encrypts the call content.

Figure 2:
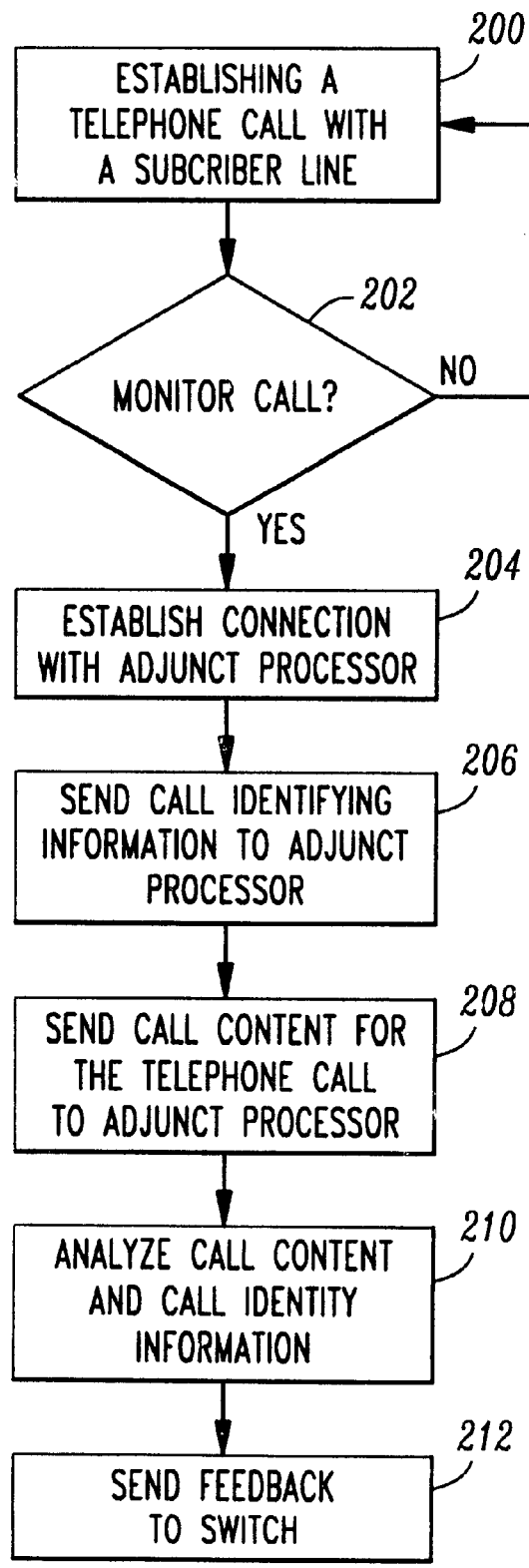
FIG. 2 is a flow chart illustrating a method for enhanced subscriber line call monitoring in accordance with the present invention.

FIG. 2 is a flow chart illustrating a method for enhanced subscriber line call monitoring in accordance with the present invention. FIG. 2 is described below with reference to the preferred embodiment shown in FIG. 1.

First a telephone call is established with a subscriber line terminated by switch 102 (200). The call is initiated by a customer premise equipment terminated on a subscriber line 110 or alternatively, by another communications device that is coupled to telephone network 106. After the call is established (200), switch 102 determines whether the call should be monitored (202). A number of criteria are alternatively used by switch 102 to determine whether a call is monitored. Preferably, a stored program is used to selectively determine which calls are to be monitored. For example, calls are monitored randomly. That is, whether a call is monitored or not is determined based on a random function, such as a random number generator. Alternatively, a sample number of calls out of N calls may be randomly sampled. In another embodiment, all calls to a particular subscriber line 110 are selected for monitoring. In other alternatives, all subscriber lines to a particular customer are monitored. In addition, calls are monitored based on the calling or called number. Calls may also be monitored based on the treatment of the call. Any identifying information associated with a line or call is used optionally to determine whether the call should be monitored. In addition, calls are alternatively excluded based on identifying information. For example, emergency calls or calls to a specific number, e.g. 911, may be excluded. Most preferably, a privacy code may be entered on a per call basis, or included in the subscriber's service record, to exclude certain calls or all calls from monitoring.

If monitoring is not required or desired, the telephone call is completed in the normal manner. On the other hand, if the call is to be monitored, a connection is established between telecommunications switch 102 and adjunct processor 104 (204). The original call is completed and in addition, another connection or bridge is created to deliver the call content to the adjunct for analysis. Preferably, switch 102 and adjunct processor 104 have an established communication protocol and exchange identifying information for the call to be monitored. Communications are established on either a per call basis between adjunct processor 104 and switch 102 or communications between adjunct processor 104 and switch 102 may be ongoing or continuous. The connection between switch 102 and adjunct processor 104 preferably includes a data interface for the exchange of messages or instructions between switch 102 and adjunct processor 104. In addition, the connection between switch 102 and adjunct processor 104 includes a link for receipt of the call content, for example, voice or data exchanged over the call between the calling and called parties.

After a connection is established with the adjunct processor 104 (204), call identifying information is sent to adjunct processor 104 by switch 102 (206). Preferably, the call identifying information includes a time of call, a calling party number, a called party number, a subscriber line identification, a call event identifier, packet service indication, and other identifying information, which may be associated with the particular equipment and links used to connect the call in switch 102 or other elements of telephone network 106. Adjunct processor 104 uses the call identifying information to allocate and set up storage facilities for receiving and analyzing call content. In particular, adjunct processor 104 may be programmed to perform certain monitoring or analysis based on the call identifying information and transmit results to switch 102 to be used for real-time modification of service.

After call identifying information is sent to the adjunct processor 104 by switch 102 (206), the call content for the telephone call is relayed to adjunct processor 104 by switch 102 (208). In particular, switch 102 replicates or duplicates the data for the call and forwards that data to adjunct processor 104. The call content is determined in part by the call type and may include analog audio, digital audio, circuit or packet data. The call content is sent to adjunct processor 104 in real time as it is received by switch 102 from either a subscriber line or an element connected to telephone network 106.

As the call content is sent to adjunct processor 104, adjunct processor 104 analyzes the call content in association with the call identity information (210). In particular, adjunct processor 104 analyzes the call content in accordance with a stored program providing numerous alternatives for analysis. For example, adjunct processor 104 analyzes the time, duration, quality of transmission and frequency of the call. Adjunct processor 104 may analyze the identification information and call content with reference to stored call content and call identification information associated with prior calls. Adjunct processor 104 may analyze calling patterns to certain called numbers or calling numbers. Adjunct processor 104 alternatively analyzes the call content type or class. For example, whether the call is a voice or modem/facsimile call. After the calls content type is determined, quality measurements may be made on the basis of the call content type. For example, for a modem call, the effective modem speed is analyzed. For a voice call, the signal to noise ratio is monitored. For certain data protocols, the number of retries or other quality measurements are made.

Other analysis performed by adjunct processor 104 includes determining specific features used with a call. For example, adjunct processor 104 monitors whether call forwarding, three-way or multi-way calling or other features are used in association with a particular call. Other features subject to analysis include the correlation of trouble reports or other service debilitating features in combination with call content. Other features for service evaluation include echo return level, echo delay, bit error rate, effective data rate, noise measurements, and transmission levels.

Any analysis from adjunct processor 104 is preferably provided as feedback to switch 102 for adjustment of features (212). For example, feedback may be used to adjust physical network connection properties, such as the adjustment of a per-line impedance matching network to improve transmission quality. A telecommunications service provider uses the analysis performed by adjunct processor 104 for network management, long term usage forecasting, and service differentiation and selected marketing. In addition the analysis is made available for use in traditional services and applications, for example, billing. In particular, a service provider may bill a customer based on a quality of service or adjustment to the quality of service based on call content received by adjunct processor 104.

The analysis provided by system 100 as described above has numerous applications, a few of which are enumerated below. Network demand is forecasted including identifying optimal equipment growth, reconfiguration and routing changes. Studies are readily performed on the usage of data vs. voice calls for tariff adjustment. New and additional services are readily targeted to customers based on current usage. For example, enhanced subscriber line monitoring data may be used for marketing bulk calling plans, automatic route selection plans, incoming lines, or voice mail. Enhanced subscriber line monitoring may be contracted by a service provider to model a particular customer's network usage to project savings from rearrangement and reallocation of resources. Real-time feed back from call monitoring is readily used for network management and modifying call routing to avoid congestion or poor quality service. In addition, certain alarms detected in the call content may be used as events to trigger an action by a service provider.

A method is described above for enhanced subscriber line monitoring by an adjunct processor coupled to a telecommunications switch to receive call identification and call content associated with telephone calls. The call content is used to classify the calls (e.g., voice or data) and then to monitor usage and quality parameters. By virtue of the present invention, network management and forecasting is optimized and real-time data is provided for optimal network usage and trouble identification.

What is claimed is:

1. A method for monitoring a subscriber line to enhance services associated with the subscriber line, the method comprising the steps of:
   A) a telecommunications switch establishing a telephone call with the subscriber line;
   B) establishing a connection between the telecommunications switch and an adjunct processor;
   C) sending call identifying information for the telephone call to the adjunct processor;
   D) sending call content that is received by the telecommunications switch for the telephone call to the adjunct processor;
   E) the adjunct processor performing an analysis on the call content and the call identifying information;
   F) the adjunct processor sending a feedback to the telecommunications switch during the telephone call, the feedback being based on the analysis; and
   G) the telecommunications switch adjusting a quality of the telephone call during the telephone call based on the feedback.

2. The method of claim 1 wherein step A includes determining whether the telephone call should be monitored.

3. The method of claim 1 wherein the step of determining whether the call should be monitored is determined based on whether the telephone call is completed successfully.

4. The method of claim 1 wherein the analysis determines a class of call content and the class of call content includes a data call or a voice call.

5. The method of claim 1 wherein the analysis determines a quality measure for the telephone call and the quality measure includes at least one of a signal to noise ratio, effective data rate, echo return level, echo delay, bit error rate, and a noise measurement.

6. The method of claim 1 wherein the analysis determines a feature used and the feature used is at least one of call forwarding and multi-way calling.

7. The method of claim 1 wherein the step of adjusting a quality of the telephone call includes adjusting an impedance matching network associated with the telephone call.

8. The method of claim 1 wherein step D further comprises scrambling the call content prior to sending the call content to the adjunct processor.

9. An apparatus for monitoring a subscriber line comprising:
   a telecommunications switch for establishing a telephone call with the subscriber line;
   an adjunct processor coupled to the telecommunications switch to provide a connection between the adjunct processor and the telecommunications switch;
   wherein the telecommunications switch:
      sends call identifying information for the telephone call to the adjunct processor; and
      sends call content that is received by the telecommunications switch for the telephone call to the adjunct processor;
   wherein the adjunct processor:
      performs an analysis on the call content and the call identifying information; and
      sends a feedback to the telecommunications switch during the telephone call, the feedback being based on the analysis; and
   wherein the telecommunications switch adjusts a quality of the telephone call during the telephone call based on the feedback.

10. The apparatus of claim 9 wherein the telecommunications switch determines whether the telephone call should be monitored.

11. The apparatus of claim 10 wherein the telecommunications switch determines whether the call should be monitored based on whether the telephone call is completed successfully.

12. The apparatus of claim 9 wherein the analysis determines a quality measure for the telephone call and the quality measure includes at least one of a signal to noise ratio, effective data rate, echo return level, echo delay, bit error rate, and a noise measurement.

13. The apparatus of claim 9 wherein the telecommunications switch adjusts a quality of the telephone call by adjusting an impedance matching network associated with the telephone call.

14. The apparatus of claim 9 wherein the telecommunications switch scrambles the call content prior to sending the call content to the adjunct processor.

15. The apparatus of claim 9 wherein the analysis determines a class of call content and the class of call content includes a data call or a voice call.

16. The apparatus of claim 9 wherein the analysis determines a feature used and the feature used is at least one of call forwarding and multi-way calling.

* * * * *